June 9, 1925.                               1,541,575
W. E. JENNINGS
INTERNAL COMBUSTION ENGINE
Filed April 5, 1924      2 Sheets-Sheet 2

Inventor,
Walter E. Jennings,
by Alexander S. Lentz
His Attorney.

Patented June 9, 1925.

1,541,575

UNITED STATES PATENT OFFICE.

WALTER E. JENNINGS, OF LYNN, MASSACHUSETTS, ASSIGNOR TO GENERAL ELECTRIC COMPANY, A CORPORATION OF NEW YORK.

INTERNAL-COMBUSTION ENGINE.

Application filed April 5, 1924. Serial No. 704,507.

*To all whom it may concern:*

Be it known that I, WALTER E. JENNINGS, a citizen of the United States, residing at Lynn, in the county of Essex, State of Massachusetts, have invented certain new and useful Improvements in Internal-Combustion Engines, of which the following is a specification.

The present invention relates to internal combustion engines, particularly two cycle engines, and has for its object to provide an improved means for scavenging such engines.

For a consideration of what I believe to be novel and my invention, attention is directed to the accompanying description and the claims appended thereto.

Figure 1:
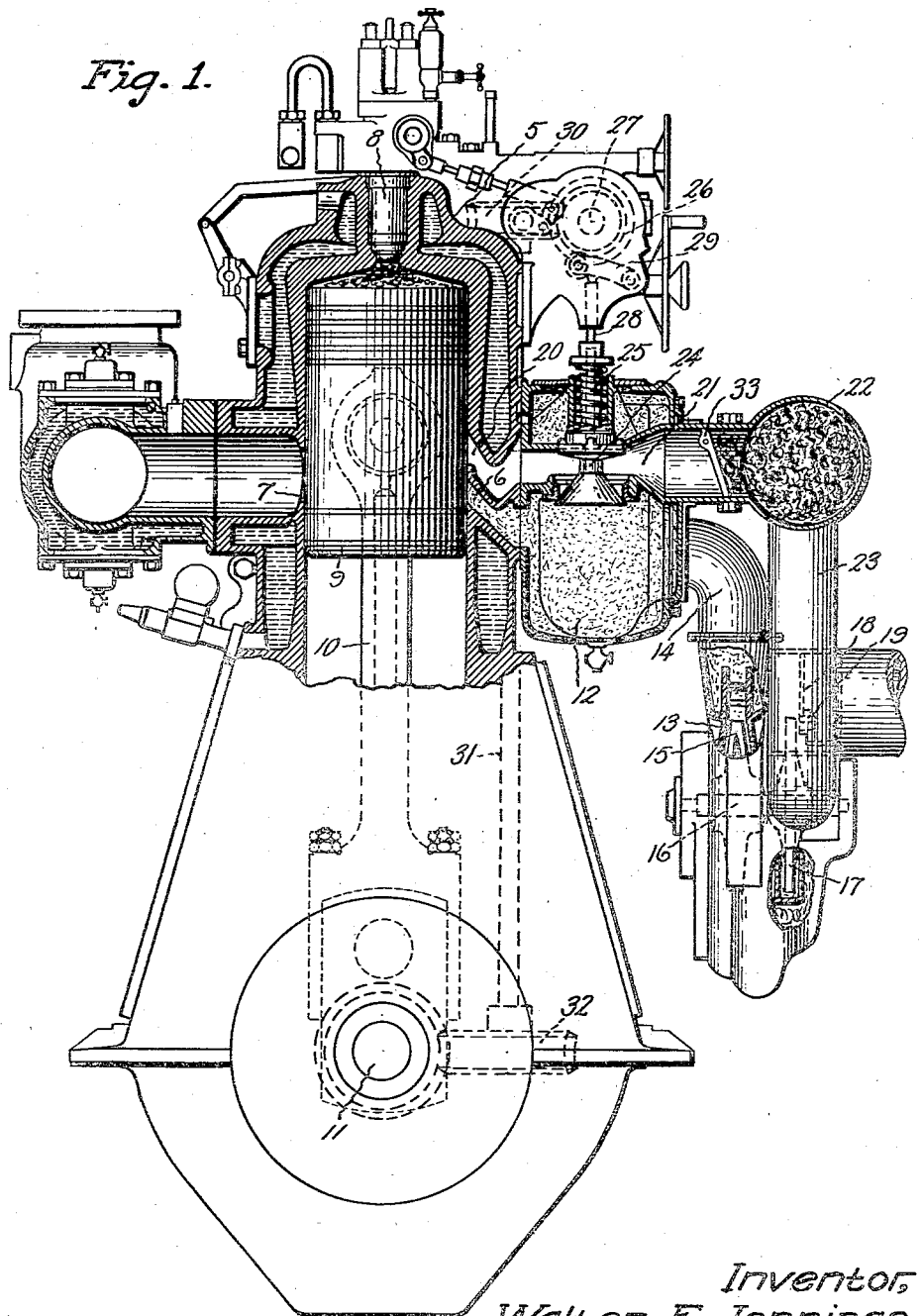
Figure 2:
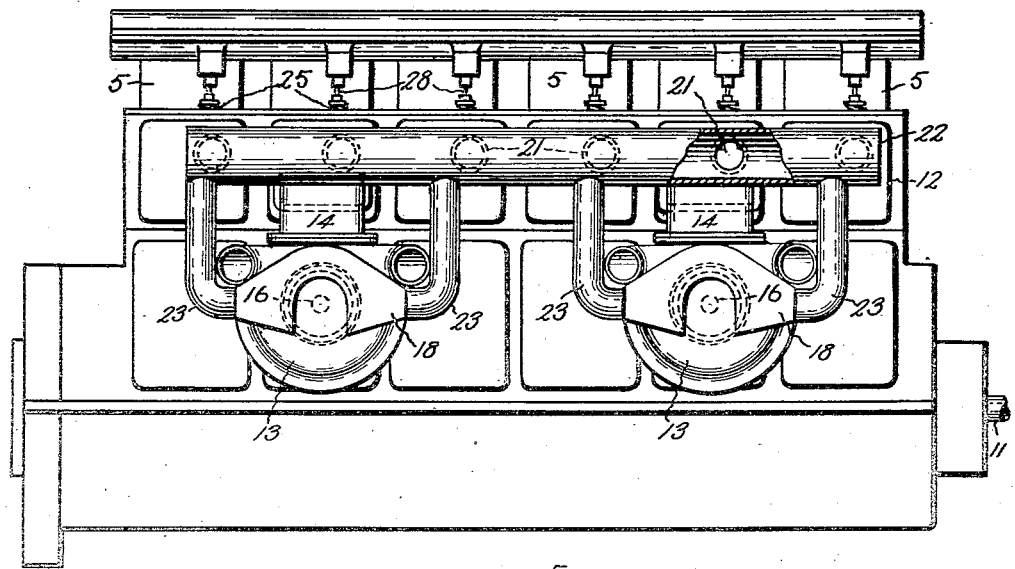
Figure 3:
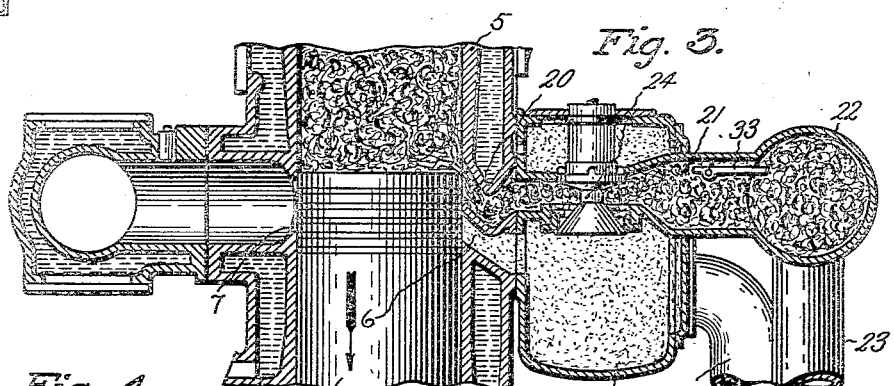
Figure 4:
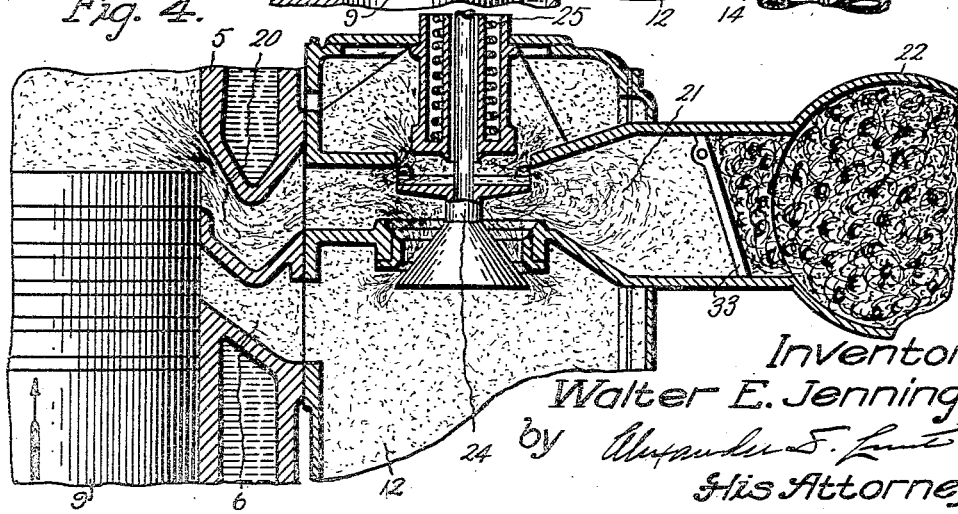

In the drawings, Fig. 1 is an end elevation partly in section of an internal combustion engine provided with scavenging means embodying my invention; Fig. 2 is a side view with certain parts broken away; and Figs. 3 and 4 are detail sectional views illustrating the operation of the invention, Fig. 4 being on a larger scale than Fig. 3.

Referring to the drawings, 5 indicates the cylinders of an internal combustion engine, here shown as being on engines of the high compression type. The cylinders are provided with scavenging ports 6, exhaust ports 7 and fuel injectors 8. In the cylinders are pistons 9 to which are connected piston rods 10, the latter being connected to the crank shaft 11. The scavenging air ports 6 and the exhaust ports 7 are controlled by the engine pistons in the well understood manner. The foregoing structure illustrated in the drawing is shown only by way of example and is to be taken as typical of any suitable two-cycle engine scavenged by compressed air. The detail structure is specifically illustrated and described only in so far as it is related to the invention.

The scavenging ports 6 are all connected to a manifold 12 which is supplied with scavenging air by two centrifugal compressors 13 through the compressor discharge pipes 14. The compressor impellers are indicated at 15, and the compressor shafts at 16. Impellers 15 are driven by turbine wheels 17 which are mounted directly on shafts 16 outside the compressor casings. Adjacent each turbine wheel is a nozzle box 18 provided with nozzles 19 for supplying actuating fluid to the turbine wheel to operate it.

In cylinders 5 in advance of scavenging ports 6 and exhaust ports 7 are additional ports 20 which perform a double function, serving first as exhaust ports and then as auxiliary scavenging ports. Ports 20 are connected by conduits 21 to a manifold 22 which in turn is connected by conduits 23 to nozzle boxes 18. Conduits 21 extend through manifold 12 and in the walls of each conduit is a valve 24 adapted when open to connect the conduits to the manifold. Valves 24 are biased toward closed position by springs 25 and are opened by cams 26 carried by a cam shaft 27 and engaging the ends of the valve stem 28 through the intermediary of levers 29. Cam shaft 27 is driven by suitable gear means 30 connected by a vertical shaft 31 and gear means 32 to the engine shaft 11. In each conduit 21 is a suitable non-return valve 33 located beyond valve 24 as regards the flow of gas from the engine cylinder.

The operation is as follows:—Referring first to Fig. 1, assume that the engine is running and that piston 9 of the one cylinder is just starting on its down or working stroke, a charge of fuel having been admitted and ignited. At this time valve 24 is closed and also the non-return valve 33. Manifold 22 contains exhaust gas from the cylinders which is being supplied to the turbine wheel 17 to operate it and the turbine wheel in turn is operating the compressor impeller 15 which is supplying scavenging air to manifold 12. As piston 9 descends, it first uncovers port 20 permitting gas to escape through such port to manifold 22, the pressure of the gas opening valve 33. This is illustrated in Fig. 3 from which it will be seen that piston 9 uncovers port 20 just prior to its uncovering exhaust port 7. As the piston descends further it begins to uncover exhaust port 7 and when this is partly uncovered, scavenging port 6 begins to be uncovered. At some point during this portion of the stroke, that is, after exhaust port 7 begins to uncover, the pressure in cylinder 5 falls below that in manifold 22 whereupon non-return valve 33 is forced closed. The piston, upon reaching the bottom of its stroke, completely uncovers port 6 and scavenging air flows through it from manifold 12, scavenging the engine cylinder in the well understood manner. Piston 9 now begins to move upward again covering ports 6 and 7 and during the initial portion of this up stroke valve 24 is opened to admit scavenging air through port 20. Before port 20 is closed port 7 is closed and during the period between the closing of port 7 and the closing of port 20 air is forced through port 20 to raise the initial pressure of the charge of air in the cylinder.

It will be seen that by the above-described arrangement, a single port 20 in each cylinder is made to perform two functions, first that of supplying gas for operating the turbo-compressor and then that of supplying the final charge of scavenging air to the engine cylinder. It will be understood that the turbo-compressor may supply scavenging air at the desired pressure.

The valves 24 are timed to open at the correct instant and remain open during the desired interval of time.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with an internal combustion engine comprising a cylinder having scavenging and exhaust ports, of a centrifugal air compressor having its discharge side connected to the scavenging port, a turbine wheel for driving the compressor, a nozzle box having nozzle means for directing actuating fluid to the turbine wheel, a port in the cylinder which is opened in advance of the opening of the scavenging port, and means for connecting it to the nozzle box and to the discharge side of the compressor.

2. The combination with an internal combustion engine comprising a cylinder structure having scavenging and exhaust ports, of a centrifugal air compressor for supplying scavenging air to the scavenging ports, a turbine for driving the compressor, a chamber from which actuating fluid is directed to the turbine, ports in the cylinder structure which are opened in advance of the opening of the scavenging ports and closed subsequently thereto, and means for connecting such ports to said chamber and to the discharge side of the compressor.

3. The combination with an internal combustion engine having a cylinder and a port therein, of a compressor for supplying scavenging air to the engine cylinder, a turbine for operating it, and means for connecting said port to the turbine for supplying actuating fluid thereto and to the discharge side of the compressor for supplying scavenging air to the cylinder.

4. The combination with an internal combustion engine comprising a cylinder structure having scavenging and exhaust ports, of a scavenging air receiver, a pump for supplying scavenging air thereto, fluid actuated means for operating the pump, a chamber from which fluid is supplied to such means, additional ports in the cylinder structure for supplying fluid to said chamber, and valve means for connecting said ports to the scavenging air receiver.

5. The combination with an internal combustion engine comprising a cylinder structure having scavenging and exhaust ports, of a scavenging air receiver, a pump for supplying scavenging air thereto, a turbine for operating the pump, a chamber for supplying actuating fluid to the turbine, ports in the cylinder structure which are opened in advance of the exhaust ports and closed subsequently thereto, and means for connecting such ports to the chamber during a portion of the power stroke and to the scavenging air receiver during a portion of the compression stroke.

6. The combination with a multicylinder internal combustion engine having scavenging and exhaust ports, of a scavenging air receiver, a centrifugal compressor for supplying air thereto, a turbine for operating the compressor, a header from which actuating fluid is supplied to the turbine, additional ports in at least some of said cylinders for supplying actuating fluid to said header, and valve means for connecting such additional ports to the scavenging air receiver.

In witness whereof, I have hereunto set my hand this twenty-seventh day of March, 1924.

WALTER E. JENNINGS.